United States Patent
Liu et al.

(10) Patent No.: US 12,412,080 B2
(45) Date of Patent: Sep. 9, 2025

(54) METHOD AND APPARATUS FOR FORWARD COMPUTATION OF NEURAL NETWORK, AND COMPUTER-READABLE STORAGE MEDIUM

(71) Applicant: TENCENT TECHNOLOGY (SHENZHEN) COMPANY LIMITED, Guangdong (CN)

(72) Inventors: Wen Ran Liu, Guangdong (CN); Hong Rui Chen, Guangdong (CN); Hao Yuan Li, Guangdong (CN); Qi Feng Chen, Guangdong (CN); Feng Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 994 days.

(21) Appl. No.: 17/507,127

(22) Filed: Oct. 21, 2021

(65) Prior Publication Data
US 2022/0044104 A1 Feb. 10, 2022

Related U.S. Application Data

(63) Continuation of application No. PCT/CN2020/098799, filed on Jun. 29, 2020.

(30) Foreign Application Priority Data

Dec. 16, 2019 (CN) .......................... 201911294777.2

(51) Int. Cl.
*G06N 3/063* (2023.01)
(52) U.S. Cl.
CPC .................................. *G06N 3/063* (2013.01)

(58) Field of Classification Search
CPC ........ G06N 3/063; G06N 3/045; G06N 3/084; G06T 1/20; G06T 1/60; G06T 7/40; G06T 7/90
See application file for complete search history.

(56) References Cited

U.S. PATENT DOCUMENTS

2015/0379676 A1* 12/2015 Girado ..................... G06T 7/40
345/501
2018/0239992 A1 8/2018 Chalfin et al.
(Continued)

FOREIGN PATENT DOCUMENTS

| CN | 106471545 A | 3/2017 |
| CN | 107836001 A | 3/2018 |

(Continued)

OTHER PUBLICATIONS

International Search Report of PCT/CN2020/098799 dated Sep. 28, 2020 [PCT/ISA/210].

(Continued)

*Primary Examiner* — Wesley J Tucker
(74) *Attorney, Agent, or Firm* — Sughrue Mion, PLLC

(57) ABSTRACT

A method and an apparatus for forward computation of a neural network are provided. The method includes: obtaining input data and weight data of at least one data processing layer; storing the input data by using a first texture storage structure to obtain first texture data; storing the weight data by using a second texture storage structure to obtain second texture data; and performing data processing of the at least one data processing layer based on the first texture data and the second texture data, to obtain output data of the at least one data processing layer. For the at least one data processing layer in the neural network, the input data and the weight data are respectively stored in corresponding texture storage structures.

20 Claims, 5 Drawing Sheets

(56) References Cited

U.S. PATENT DOCUMENTS

| | | | |
|---|---|---|---|
| 2021/0312592 A1* | 10/2021 | Liu | G06T 3/4053 |
| 2021/0374956 A1* | 12/2021 | Zheng | G16H 30/40 |
| 2021/0398244 A1* | 12/2021 | Beets | G06T 11/40 |
| 2022/0028155 A1* | 1/2022 | Li | G06T 1/20 |
| 2023/0082839 A1* | 3/2023 | Petersen | G06T 3/40 |
| | | | 345/441 |
| 2023/0245420 A1* | 8/2023 | Yuan | G06T 9/00 |
| | | | 382/108 |

FOREIGN PATENT DOCUMENTS

| | | |
|---|---|---|
| CN | 110555793 A | 12/2019 |
| CN | 111091188 A | 5/2020 |

OTHER PUBLICATIONS

Written Opinion of PCT/CN2020/098799 dated Sep. 28, 2020 [PCT/ISA/237].
Chinese Office Action of No. 201911294777.2 dated Jul. 15, 2021.

* cited by examiner

METHOD AND APPARATUS FOR FORWARD COMPUTATION OF NEURAL NETWORK, AND COMPUTER-READABLE STORAGE MEDIUM

CROSS-REFERENCE TO RELATED APPLICATIONS

This application is a bypass continuation application of International Application No. PCT/CN2020/098799, filed on Jun. 29, 2020, which claims priority to Chinese Patent Application No. 201911294777.2, filed on Dec. 16, 2019, the disclosures of which are herein incorporated by reference in their entireties.

FIELD

The disclosure relates to computer technologies, and specifically, to a method and an apparatus for forward computation of a neural network, an electronic device, and a computer-readable storage medium.

BACKGROUND

A forward propagation algorithm of a neural network may implement graphics processing unit (GPU) computation on different platforms such as a mobile terminal and a PC terminal. Different platforms use different computation libraries or graphic libraries. On the mobile terminal, APIs such as OpenCL and OpenGL are usually used for implementation. On the PC terminal running a Windows operating system, due to versatility of Direct3D, a graphic library of Direct3D may be used to implement the forward propagation algorithm of the neural network. Forward computation of the neural network mainly includes computation of each layer of the network in a GPU, including uploading an input and a weight of each layer to the GPU, and computing a result in the GPU. In a related technical solution, a buffer structure is used as for data storage, that is, the input and the weight of each layer of the network are uploaded to buffers of the GPU, then the data stored in the buffers is used for computation in the GPU, and finally a central processing unit (CPU) reads a buffer in the GPU to obtain a computation result. However, because storage of the buffers in an internal memory is linear, a relatively long time is required for the GPU to read and store data in structures of the buffers, resulting in low efficiency of forward computation.

SUMMARY

One or more embodiments resolve at least one of the above-described technical defects. Technical solutions provided in embodiments of this application are as follows:

According to an aspect of an embodiment, a method for forward computation of a neural network, for data processing of at least one data processing layer in the neural network is provided. The method includes:
  obtaining input data and weight data of the at least one data processing layer;
  storing the input data by using a first texture storage structure to obtain first texture data, a plurality of data elements in the input data corresponding to a first index of the first texture data, and a computer device accessing data in the first texture data by using the first index as a unit;
  storing the weight data by using a second texture storage structure to obtain second texture data, a plurality of data elements in the weight data corresponding to a second index of the second texture data, and the computer device accessing data in the second texture data by using the second index as a unit; and
  performing data processing of the at least one data processing layer based on the first texture data and the second texture data, to obtain output data of the at least one data processing layer.

According to an aspect of an embodiment, an apparatus configured to perform data processing of at least one data processing layer in a neural network is provided. The apparatus includes:
  at least one memory configured to store program code; and
  at least one processor configured to read the program code and operate as instructed by the program code, the program code including:
  data obtaining code configured to cause at least one of the at least one processor to obtain input data and weight data of the at least one data processing layer;
  data storage code configured to cause at least one of the at least one processor to store the input data by using a first texture storage structure to obtain first texture data, and store the weight data by using a second texture storage structure to obtain second texture data, a plurality of data elements in the input data corresponding to a first index of the first texture data, a plurality of data elements in the weight data corresponding to a second index of the second texture data, and the apparatus accessing data in the first texture data by using the first index as a unit and the second texture data by using the second index as a unit; and
  data processing code configured to cause at least one of the at least one processor to perform data processing of the at least one data processing layer based on the first texture data and the second texture data, to obtain output data of the at least one data processing layer.

According to an aspect of an embodiment, an electronic device, includes a memory and a processor;
  the memory storing a computer program; and
  the processor being configured to execute the computer program to implement the foregoing method.

According to an aspect of an embodiment, a computer-readable storage medium, stores a computer program, the computer program being executed by a processor to implement the foregoing method.

BRIEF DESCRIPTION OF THE DRAWINGS

The above and other aspects, features, and advantages will be more clearly understood from the following description, taken in conjunction with the accompanying drawings in which.

DETAILED DESCRIPTION

Figure 1:
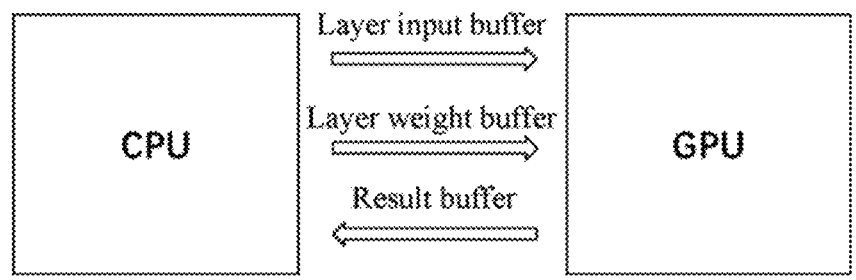
FIG. 1 is a schematic diagram of forward computation of a neural network.

Embodiments are described in detail below, and examples of the embodiments are shown in accompanying drawings. The same or similar elements or the elements having same or similar functions are denoted by the same or similar reference numerals throughout the description. The embodiments that are described below with reference to the accompanying drawings are provided as examples, and are not to be construed as limiting the disclosure.

It is to be understood that the singular terms "a", "an", "said", and "the" used herein may include the plural forms as well, unless the context clearly indicates otherwise. It is to be further understood that, the terms "include" and/or "comprise" used herein refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of this disclosure clearer, the following further describes implementations in detail with reference to the accompanying drawings.

Artificial intelligence (AI) is a theory, a method, a technology, and an application system that use a digital computer or a machine controlled by a digital computer to simulate, extend, and expand human intelligence, perceive an environment, obtain knowledge, and obtain an optimal result with knowledge. In other words, AI is a comprehensive technology of computer science that seeks to understand the essence of intelligence and produce a new intelligent machine that may react in a way similar to human intelligence. AI is to study design principles and implementation methods of various intelligent machines, to enable the machines to have functions of perception, reasoning, and decision making.

AI technology relates to a wide range of fields including a hardware-level technology and a software-level technology. AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing (NLP) technology, and machine learning (ML)/deep learning.

CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for humans to observe, or an image transmitted to an instrument for detection. As a scientific discipline, CV studies related theories and technologies and attempts to establish an AI system that may obtain information from images or multi-dimensional data. CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality (VR), augmented reality (AR), synchronous positioning, and map construction, and further include common biological feature recognition technologies such as face recognition and fingerprint recognition.

Key technologies of speech technologies include an automatic speech recognition (ASR) technology, a text to speech (TTS) technology, and a voiceprint recognition technology. It is a future development direction of human-computer interaction to enable computers to listen, see, speak, and feel, among which voice has become one of the most promising human-computer interaction methods in the future.

NLP is an important direction in the field of computer science and the field of AI. It studies various theories and methods that may realize effective communication between humans and computers in a natural language. NLP is a science that integrates linguistics, a computer science, and mathematics. Therefore, research in this field involves natural languages, that is, languages people use daily, and it is closely related to research of linguistics. NLP technologies generally include text processing, semantic understanding, machine translation, robot Q&A, knowledge graph, and other technologies.

ML is a multi-field interdisciplinary subject involving a probability theory, statistics, an approximation theory, convex analysis, an algorithm complexity theory, and the like. ML specializes in studying how a computer simulates or implements human learning behavior to obtain new knowledge or skills, and reorganize an existing knowledge structure to continuously improve its performance. ML is the core of AI, is a way to make a computer intelligent, and is applied to various fields of AI. ML and deep learning generally include technologies such as an artificial neural network, a belief network, a reinforcement network, transfer learning, inductive learning, and learning from demonstrations.

Automated driving technologies generally include high-precision map, environment perception, behavior decision-making, path planning, motion control, and other technologies, which have a wide range of application prospects.

With the research and progress of AI technologies, the AI technologies have been researched and applied to many fields, such as common smart homes, smart wearable devices, virtual assistants, smart speakers, smart marketing, unmanned driving, automated driving, unmanned aerial vehicles, robots, smart healthcare, and intelligent customer services, it is believed that with the development of technologies, the AI technologies will be applied to more fields and play more and more important values.

The solutions provided by embodiments relate to ML and other technologies of AI, which are specifically described by using the following embodiments.

As shown in FIG. 1, for forward computation of a neural network, a buffer structure may be used as a data storage manner, that is, an input and a weight of each layer of the network are uploaded to buffers (corresponding to a layer input buffer and a layer weight buffer in the figure) of the GPU, then the data in buffers are used for computation in the GPU, and finally a CPU reads a buffer (corresponding to a result buffer in the figure) in the GPU to obtain a computation result. However, because storage of the buffers in an internal memory is linear, a relatively long time is required for the GPU to read and store data in structures of the buffers, resulting in low efficiency of forward computation. For the foregoing problem, embodiments provide a method for forward computation of a neural network.

Figure 2A:
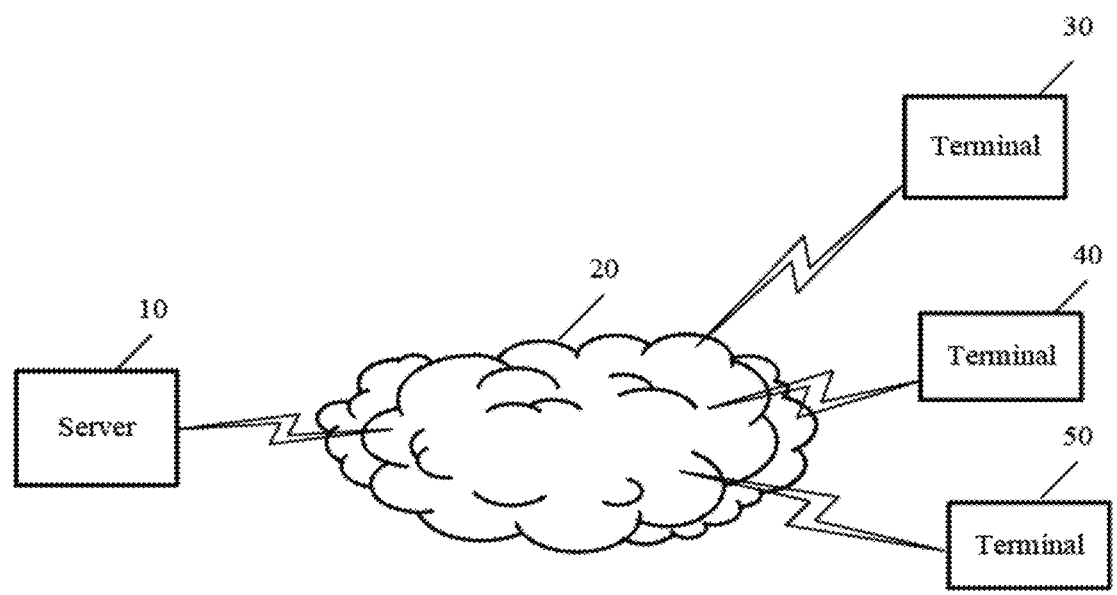
FIG. 2A is a schematic diagram of an application scenario of a method for forward computation of a neural network according to an embodiment.
Figure 2B:
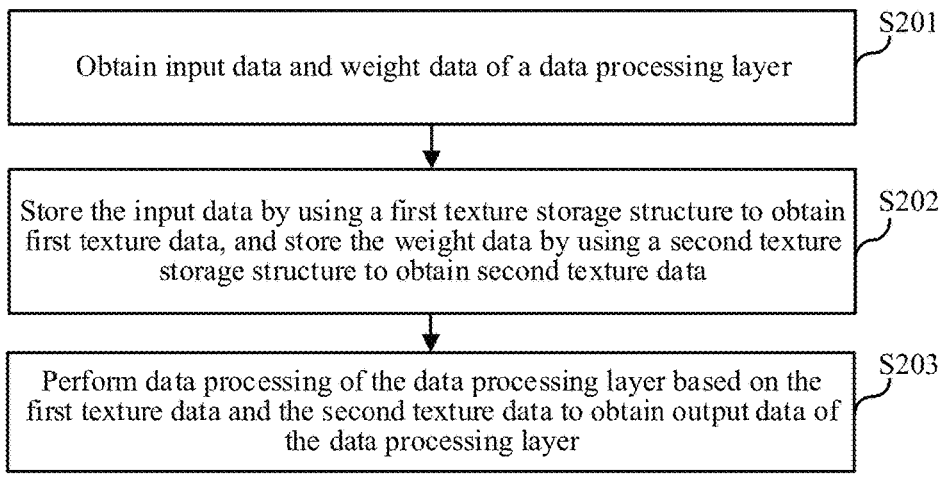
FIG. 2B is a schematic flowchart of a method for forward computation of a neural network according to an embodiment.

FIG. 2A is a schematic diagram of an application scenario of a method for forward computation of a neural network according to an embodiment. In the application scenario, a server 10 communicates with terminal devices 30, 40, and 50 by using a network 20. The method in the embodiments may be performed by a computer device. For example, the computer device may be the server 10 or the terminal device 30, 40, or 50 shown in FIG. 2A. The server 10 may be an independent physical server device, or may be a physical server in a server cluster. The terminal device 30, 40, or 50 may be a PC, a notebook computer, a tablet computer, a smartphone, a smart television, a game console, or the like. FIG. 2B is a schematic flowchart of a method for data processing of at least one data processing layer in the neural network. The method may be performed by a GPU in a computer device. As shown in FIG. 2B, the method may include the following operations:

Operation S201. Obtain input data and weight data of the data processing layer.

The data processing layer is generally a hidden layer in the neural network. The neural network may include a plurality of data processing layers. A forward computation process of the neural network is a process in which data processing layers in the neural network perform data processing. Data processing of each data processing layer may also be understood as a forward computation process of the data processing layer, which is a process of performing a corresponding operation on each piece of input data of the data processing layer and weight data corresponding to the input data, to obtain corresponding output data.

Operation S202. Store the input data by using a first texture storage structure to obtain first texture data, and store the weight data by using a second texture storage structure to obtain second texture data. A plurality of data elements in the input data correspond to the same index in the first texture data, a plurality of data elements in the weight data correspond to the same index in the second texture data, and the computer device accesses data in the first texture data and the second texture data by using the index as a unit.

The texture storage structure is a structured storage form. A shader in the GPU may be used to read data from and write data into the texture storage structure. A data storage manner of the texture storage structure includes a 2D texture storage structure, a 3D texture storage structure, a 2D texture storage structure array, and the like. A basic unit in the texture storage structure may be referred to as a texel. Each texel may include a plurality of channels, for example, R, G, and B channels, or R, G, B, and A channels. The texture storage structure is mainly characterized in the following two aspects. In one aspect, for the texture storage structure, texture coordinates are usually applied to a surface, and the texture coordinates may be used as indexes of data stored in the texture storage structure. Based on the texture coordinates, when the GPU reads data from the texture storage structure and stores data into the texture storage structure, because the indexes in the texture storage structure are simple and convenient, both data reading and storage speeds of the GPU are higher than those of a buffer storage structure. In the other aspect, a texel in the texture storage structure may include a plurality of channels. Therefore, the texel may store a plurality of pieces of data. Every time the GPU reads a texel, data of all channels in the texel may be read. Similarly, the GPU may store data into all channels of a texel every time the GPU writes data to the texel. Therefore, the GPU reads a relatively large data amount from the texture storage structure every time data is read from the texel, and also stores a relatively large data amount into the texture storage structure. Because the GPU has a relatively large data throughput in data storage or reading in the texture storage structure, both data reading and storage speeds of the GPU are higher than those of a buffer storage structure.

In some embodiments, in the forward computation process of the neural network, input data and weight data usually have different data amounts or sizes, and therefore are stored separately, that is, for each data processing layer, the GPU separately stores obtained input data and weight data of the data processing layer into different texture storage structures, to obtain corresponding texture data.

Operation S203. Perform data processing of the data processing layer based on the first texture data and the second texture data, to obtain output data of the data processing layer.

In some embodiments, the GPU reads input data from the first texture data and reads corresponding weight data from the second texture data, and performs forward computation based on the input data and the corresponding weight data to obtain corresponding output data. After forward computation between each piece of input data and weight data corresponding to the input data is completed, all output data of the data processing layer is obtained.

It may be understood that, in the forward computation process of the neural network, one or more data processing layers may adopt the solution of operation S201 to operation S203 for data processing. When two consecutive data processing layers both adopt the solution of operation S201 to operation S203 for data processing, for the former data processing layer, after completing operation 203, the GPU may further perform an operation of storing output data of the data processing layer into a corresponding texture storage structure.

Figure 3:
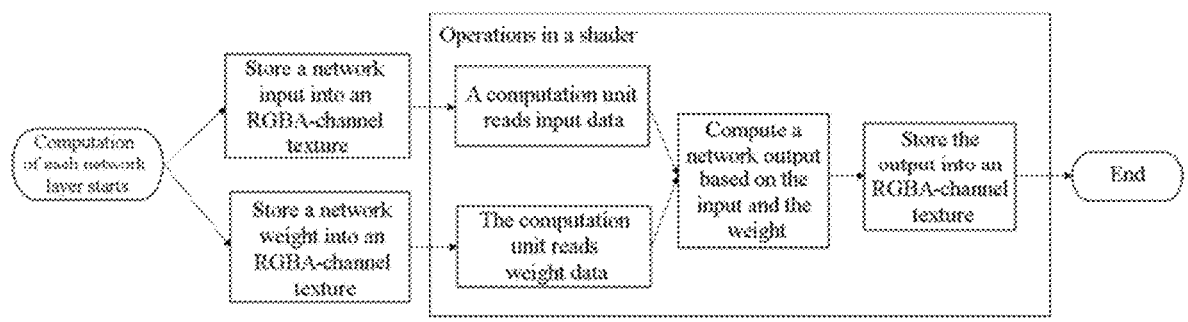
FIG. 3 is a schematic diagram of a data processing process of a data processing layer in an example according to an embodiment.

This is further described below by using a specific example. As shown in FIG. 3, a texture storage form used in the example is an RGBA-channel texture storage form, and each data processing layer (that is, a network layer in the figure) in the neural network adopts the solution of operation S201 to operation S203 for data processing.

As shown in FIG. 3, after forward computation of each network layer starts, the GPU stores input data (that is, a network input in the figure) of each network layer into a corresponding RGBA-channel texture, and stores weight data (that is, a network weight in the figure) of each network layer into a corresponding RGBA-channel texture. The shader of the GPU respectively reads the input data and the weight data from the two RGBA-channel textures. The GPU then obtains output data of the network layer according to the input data and the weight data. In some examples, for ease of forward computation of a next network layer, the GPU stores the output data of the network layer into a corresponding RGBA-channel texture. So far, the forward computation of the network layer ends.

According to the solution provided in an embodiment, for the at least one data processing layer in the neural network, the input data and the weight data are respectively stored in corresponding texture storage structures, so that a time consumed by the data processing layer to read and store data in a data processing process is reduced, and efficiency of forward computation of the neural network is improved greatly, because the texture storage structures have simple and convenient indexes and store a large data amount.

In an embodiment, the first texture storage structure or the second texture storage structure may be any one of the following:

a red, green, blue, alpha (RGBA)-channel 3D texture storage structure;
an RGB-channel 3D texture storage structure;
an RGBA-channel 2D texture storage structure; and
an RGB-channel 2D texture storage structure.

In some embodiments, a difference between a 3D texture storage structure and a 2D texture storage structure lies in that the 3D texture storage structure has different depths, that is, texels of 3D texture storage structure may be set at different depths, while the 2D texture storage structure may be considered as a 3D texture storage structure with a depth of 1. Each texel in an RGBA-channel 2D or 3D texture storage structure may store four pieces of data, and each texel in an RGB-channel 2D or 3D texture storage structure may store three pieces of data. It may be understood that, a data storage manner used for the texture storage structure may be determined according to an actual requirement. For the same texture storage structure, a single texel having a larger quantity of channels may store a larger data amount, and the GPU has a larger data throughput in each reading and storage operation, so that efficiency of forward computation is higher.

In some embodiments, the first texture data and the second texture data each include at least one texel, each texel has a channel quantity of 3 or 4, and at least one texel is formed by corresponding input data or weight data sequentially according to the channel quantity.

In some embodiments, the first texture data includes at least one texel indexed in at least two dimensions, each texel has a plurality of channels, and each channel is used for storing a data element in the input data. In this case, when the input data is stored, data elements in the input data may be sequentially stored into channels of texels.

The texel may be understood as a basic unit of texture data. When reading data from the texture data, the GPU may read data stored in a texel every time; and when storing data into texture data, the GPU may store data into all channels of a texel. A quantity of channels included in each texel determines a data throughput of the texel. Because the texture storage structure corresponding to the first texture data and the texture storage structure corresponding to the second texture data are three-channel or four-channel, a texel in the first texture data and a texel in the second texture data include three channels or four channels, that is, channel quantities are 3 or 4.

In some embodiments, a plurality of channels of each texel may be sequentially stacked. For example, for a texel including R, G, and B channels, the R channel, the G channel, and the B channel in the texel are sequentially stacked from bottom to top, and each channel stores input data or weight data to form corresponding texture data. A plurality of texels included in 3D texture data may be sequentially stacked in a depth direction, and each texel includes arrangement information of R, G, and B channels, or may include arrangement information of R, G, B, and A channels. For example, referring to FIG. 5, the 3D texture data may include texture data of two texels (a texel 1 and a texel 2) with a depth of 2, the texel 1 and the texel 2 may be sequentially stacked from bottom to top in the depth direction, and each texel may include R, G, B, and A channels. Specifically, the texel 1 includes four channels corresponding to blocks numbered "1, 2, 3, 4", and the texel 2 includes four channels corresponding to blocks numbered "5, 6, 7, 8".

In some embodiments, the storing the input data by using a first texture storage structure to obtain first texture data includes:

obtaining a pixel width, a pixel height, and a channel quantity of the input data;
determining first texture storage structure parameters (that is, magnitudes in at least two dimensions and a channel quantity of each texel) of the first texture storage structure based on the pixel width, the pixel height, and the channel quantity of the input data and a data storage manner (that is, a dimension quantity of an index) of the first texture storage structure; and
storing the input data according to the first texture storage structure parameters, to obtain the first texture data.

If the input data is picture data, a data amount of the input data may be determined according to a pixel width, a pixel height, and a channel quantity of the input data. If the input data is not picture data, the input data may be analogized to picture data, and a data amount of the input data may be determined according to a pixel width, a pixel height, and a channel quantity that are obtained through analogy. For example, input data with a channel quantity of 1 is one-dimensional column data (A1, A2, A3, A4, A5), and may be analogized to picture data with a pixel width of 1, a pixel height of 5, and a channel quantity of 1. In this regard, a data amount of the input data is 5, a product of the pixel width (1), the pixel height (5), and the channel quantity (1). It may be understood that, the channel quantity of the input data is generally equal to an input channel quantity of the data processing layer below.

In some embodiments, in a process of storing the input data to obtain the first texture data, a type of the first texture storage structure parameters of the first texture storage structure for storing the input data may be determined first. Different data storage manners (for example, a 2D texture storage manner or a 3D texture storage manner) of the first texture storage structure correspond to different types of the first texture storage structure parameters. Therefore, the type of the first texture storage structure parameters needs to be determined according to the data storage manner of the first texture storage structure. After the type of the first texture storage structure parameters is determined, as values of the first texture storage structure parameters determine a data amount that may be stored in the first texture storage structure, a value of each first texture storage structure parameter is determined according to the data amount of the input data that needs to be stored (to ensure that each piece of data in the input data may be stored in the first texture storage structure). After the type and the values of the first texture storage structure parameters are determined, the first texture storage structure is determined, and the first texture data may be obtained by storing the input data into corresponding channels in corresponding texels of the first texture storage structure.

In some embodiments, if the first texture storage structure is a 3D texture storage structure, the first texture storage structure parameters include a height, a width, and a depth of the texture storage structure.

If the first texture storage structure is a 2D texture storage structure, the first texture storage structure parameters include a height and a depth of the texture storage structure.

It may be understood that, different data storage manners of a texture storage structure correspond to different types of texture storage structure parameters corresponding to the texture storage structure.

In some embodiments, the first texture storage structure is a 3D texture storage structure, and the first texture storage structure parameters include a height, a width, and a depth of the texture storage structure; and the determining first texture storage structure parameters of the first texture storage structure based on the pixel width, the pixel height, and the channel quantity of the input data and a data storage manner of the first texture storage structure includes:

using the pixel width of the input data as the width of the first texture storage structure, using the pixel height of the input data as the height of the first texture storage structure, and determining the depth of the first texture storage structure based on the channel quantity of the input data and the channel quantity of each texel in the first texture storage structure.

It may be learned from the foregoing description that, if the first texture storage structure is a 3D texture storage structure, regardless of an RGB-channel 3D texture storage structure or an RGBA-channel 3D texture storage structure, corresponding first texture storage structure parameters include a height, a width, and a depth. Before the input data is stored, values of the height, the width, and the depth of the texture storage structure need to be determined according to the data amount of the input data and the data storage manner of the texture storage structure.

In some embodiments, to store the input data, it only needs to ensure that a data storage amount of the first texture storage structure is greater than the data amount of the input data. It may be learned from the foregoing description that, the data amount of the input data is a product of the pixel width, the pixel height, and the channel quantity of the input data, and the data storage amount of the first texture storage structure is a product of the width, the height, the depth of the first texture storage structure and the channel quantity of each texel in the first texture storage structure. For ease of determining a texture location of the input data, the pixel width of the input data may be used as the width of the first texture storage structure, and the pixel height of the input data may be used as the height of the first texture storage structure. In this case, whether the data storage amount of the first texture storage structure may be greater than the data amount of the input data depends on the channel quantity of the input data, the depth of the first texture storage structure, and the channel quantity of each texel in the first texture storage structure. Therefore, regardless of whether the first texture storage structure is an RGB-channel 3D texture storage structure or an RGBA-channel 3D texture storage structure, the depth of the first texture storage structure may be determined based on the channel quantity of the input data and the channel quantity of each texel in the first texture storage structure.

In some embodiments, the determining the depth of the first texture storage structure based on the channel quantity of the input data and the channel quantity of each texel in the first texture storage structure includes:

determining the depth of the first texture storage structure by using the following expression:

$$d_1 = \left\lfloor \frac{(c_1 + s_1 - 1)}{s_1} \right\rfloor$$

where $d_1$ represents the depth of the first texture storage structure, $c_1$ represents the channel quantity of the input data, $s_1$ represents the channel quantity of each texel in the first texture storage structure, and $\lfloor \ \rfloor$ represents a round-down operation symbol.

In some embodiments, if the input data has a pixel height of w1, a pixel width of b1, and a channel quantity of c1, the pixel height w1 of the input data is used as the height of the first texture storage structure, and the pixel width b1 of the input data is used as the width of the first texture storage structure. If the first texture storage structure is an RGBA-channel 3D texture storage structure, in the first texture storage structure, a structure corresponding to a depth of 1 has a data storage amount of w1*b1*4. As the data amount of the input data is w1*b1*c1, if to store all the input data into the first texture storage structure, the depth of the texture storage structure is determined by the channel quantity c1 of the input data. When c1 is less than or equal to 4, the depth of the first texture storage structure needs to be at least 1 to meet a data amount requirement. When c1 is greater than 4 and less than or equal to 8, the depth of the first texture storage structure needs to be at least 2 to meet a data amount requirement. When c1 is greater than 8 and less than or equal to 12, the depth of the first texture storage structure needs to be at least 3 to meet a data amount requirement. By analogy, a depth value of the first texture storage structure may be determined. In other words, in this case, to maximize utilization of storage space in the first texture storage structure, the depth of the first texture storage structure may be determined by using the following expression:

$$d_1 = \left\lfloor \frac{(c_1 + 3)}{4} \right\rfloor$$

where $d_1$ represents the depth of the first texture storage structure, and $c_1$ represents the channel quantity of the input data.

If the first texture storage structure is an RGB-channel texture storage structure, in the first texture storage structure, a structure corresponding to a depth of 1 has a data storage amount of w1*b1*3. As the data amount of the input data is w1*b1*c1, if to store all the input data into the first texture storage structure, the depth of the texture storage structure is determined by the channel quantity c1 of the input data. When c1 is less than or equal to 3, the depth of the first texture storage structure needs to be at least 1 to meet a data amount requirement. When c1 is greater than 3 and less than or equal to 6, the depth of the first texture storage structure needs to be at least 2 to meet a data amount requirement. When c1 is greater than 6 and less than or equal to 9, the depth of the first texture storage structure needs to be at least 3 to meet a data amount requirement. By analogy, a depth value of the first texture storage structure may be determined. In other words, in this case, to maximize utilization of storage space in the first texture storage structure, the depth of the first texture storage structure may be determined by using the following expression:

$$d_1 = \left\lfloor \frac{(c_1 + 2)}{3} \right\rfloor$$

where $d_1$ represents the depth of the first texture storage structure, and $c_1$ represents the channel quantity of the input data.

Figure 4:
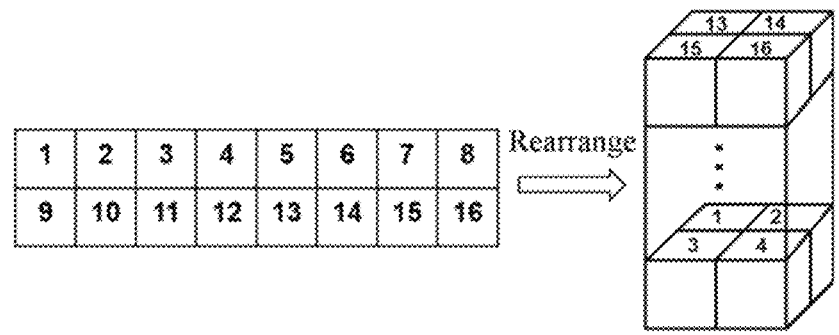
FIG. 4 is a schematic diagram of a process of storing input data in an example according to an embodiment.

For example, as shown in FIG. 4, input data of a data processing layer has a pixel width of 2, a pixel height of 2, and a channel quantity of 4. In this case, the data processing layer has a data amount of 16 (1, 2, 3, . . . , and 16 shown in the figure), and the input data may be stored by using an RGBA-channel 3D texture storage structure with a width of 2, a height of 2, and a depth of 1. As shown in the figure, a process of storing the input data may be understood as rearranging the 16 pieces of input data of the data processing layer into the RGBA-channel 3D texture storage structure with a width of 2, a height of 2, and a depth of 1.

It may be understood that, in an embodiment, after the type of the first texture storage structure parameters is determined, a manner of determining the values of the first texture storage structure parameters is not limited to the manner described above, provided that the data storage amount of the first texture storage structure corresponding to the determined first texture storage structure parameters is greater than the data amount of the input data that needs to be stored. For example, when the first texture storage structure parameters of the first texture storage structure are determined based on the pixel width, the pixel height, and the channel quantity of the input data and the data storage manner of the first texture storage structure, alternatively, the pixel width of the input data may be used as the height of the texture storage structure, and the pixel height of the input data may be used as the width of the texture storage structure. In addition, after the width and the height of the first texture storage structure are determined, the determined depth value may alternatively be greater than the depth value calculated by using the foregoing expression.

In some embodiments, the storing the weight data by using a second texture storage structure to obtain second texture data includes:

obtaining parameter data related to a data amount of the weight data;

determining second texture storage structure parameters of the second texture storage structure based on the parameter data related to the data amount of the weight data and a data storage manner (that is, a dimension quantity of an index) of the second texture storage structure, that is, determining magnitudes in at least two dimensions and a channel quantity of each texel of the second texture storage structure that enable the second texture storage structure to store a data amount not less than the data amount of the weight data; and storing the weight data according to the second texture storage structure parameters, that is, sequentially storing data elements in the weight data into channels of texels in the second texture storage structure, to obtain the second texture data.

The weight data may be analogized to picture data, to obtain a pixel width, a pixel height, and a channel quantity of the weight data. The channel quantity may be classified into an input channel quantity and an output channel quantity of the data processing layer. Different data processing layers may have different parameter data that determines data amounts of weight data of the data processing layers. For example, a data amount of weight data of a convolutional layer is related to a pixel width and a pixel height of the weight data, and an input channel quantity and an output channel quantity of the convolutional layer, while a data amount of weight data of a scaling layer is related only to a pixel width and a pixel height of the weight data, and an input channel quantity or an output channel quantity of the scaling layer. For example, a convolutional layer in a convolutional neural network has an input channel quantity of 3 and an output channel quantity of 2, whose convolution kernel has a pixel width of 3 and a pixel height of 3. In this case, a data amount of the convolutional layer is 54, product of the pixel width (3), the pixel height (3), the input channel quantity (3), and the output channel quantity (2)_.

In some embodiments, in a process of storing the weight data to obtain the second texture data, a type of the second texture storage structure parameters of the second texture storage structure for storing the weight data may be determined first. Different data storage manners (for example, a 2D texture storage manner or a 3D texture storage manner) of the second texture storage structure correspond to different types of the second texture storage structure parameters. Therefore, the type of the second texture storage structure parameters needs to be determined according to the data storage manner of the second texture storage structure. After the type of the second texture storage structure parameters is determined, as values of the second texture storage structure parameters determine a data amount that may be stored in the second texture storage structure, a value of each second texture storage structure parameter is determined according to the data amount of the weight data that needs to be stored (to ensure that each piece of data in the weight data may be stored in the second texture storage structure). After the type and the values of the second texture storage structure parameters are determined, the second texture storage structure is determined, and the second texture data may be obtained by storing the weight data into corresponding channels in corresponding texels of the second texture storage structure.

In some embodiments, if the second texture storage structure is a 3D texture storage structure, the second texture storage structure parameters include a height, a width, and a depth of the texture storage structure.

If the second texture storage structure is a 2D texture storage structure, the second texture storage structure parameters include a height and a depth of the texture storage structure.

It may be understood that, different data storage manners of a texture storage structure correspond to different types of texture storage structure parameters corresponding to the texture storage structure.

In some embodiments, the second texture storage structure is a 3D texture storage structure, and the second texture storage structure parameters include a height, a width, and a depth of the texture storage structure; and in a case that the parameter data related to the data amount of the weight data includes a pixel width and a pixel height of the weight data, and an input channel quantity and an output channel quantity of the data processing layer, the determining second texture storage structure parameters of the second texture storage structure based on the parameter data related to the data amount of the weight data and a data storage manner of the second texture storage structure includes:

determining the height and the width of the second texture storage structure based on one of the input channel quantity and the output channel quantity of the data processing layer, and the pixel width and the pixel height of the weight data; and determining the depth of the second texture storage structure based on the other of the input channel quantity and the output channel quantity of the data processing layer, and the channel quantity of each texel in the second texture storage structure.

It may be understood that, if the parameter data related to the data amount of the weight data includes the pixel width and the pixel height of the weight data, and the input channel quantity and the output channel quantity of the data processing layer, it may be understood that a dimension quantity of the weight data of the data processing layer is 4, and after the dimension quantity of the weight data is converted (reduced) from 4 to 3 (the same as that of the input data), a process of determining the second texture storage structure parameters corresponding to the weight data of the data processing layer may be performed in a manner similar to that described above of determining the texture storage structure parameters of the first texture storage structure corresponding to the input data.

In some embodiments, after dimension reduction is performed on the weight data, one of the input channel quantity and the output channel quantity, that are related to the data amount of the weight data, is merged into other data, and the other is used as parameter data corresponding to the channel quantity of the input data. Then, the second texture storage structure parameters may be determined in the foregoing manner of determining the first texture storage structure parameters.

In some embodiments, the determining the height and the width of the second texture storage structure based on one of the input channel quantity and the output channel quantity of the data processing layer, and the pixel width and the pixel height of the weight data includes:
using the pixel width of the weight data as the width of the second texture storage structure; and
using a product of the pixel height of the weight data and the channel quantity as the height of the first texture storage structure; and In some embodiments, one channel quantity may be merged into the pixel height for dimension reduction on the weight data. In other words, a product of the pixel height of the weight data and the channel quantity is used as a pixel height of the weight data after dimension reduction. Specifically, a product of the pixel height and the input channel quantity may be used as the pixel height of the weight data after dimension reduction, or a product of the pixel height and the output channel quantity may be used as the pixel height of the weight data after dimension reduction. Similar to the foregoing manner of determining the first texture storage structure parameters, the pixel height of the weight data after dimension reduction is used as the height of the second texture storage structure, and a pixel width of the weight data after dimension reduction is used as the width of the second texture storage structure.

It may be understood that, in an actual application, dimension reduction may alternatively be performed on the weight data in the following manner: using a product of the pixel width and the output channel quantity as the pixel width of the weight data after dimension reduction, or using a product of the pixel width and the input channel quantity as the pixel width of the weight data after dimension reduction.

The determining the depth of the second texture storage structure based on the other of the input channel quantity and the output channel quantity of the data processing layer, and the channel quantity of each texel in the second texture storage structure includes:
determining the depth of the second texture structure by using the following expression:

$$d_2 = \left\lfloor \frac{(c_2 + s_2 - 1)}{s_2} \right\rfloor$$

where $d_2$ represents the depth of the second texture storage structure, $c_2$ represents the other channel quantity, $s_2$ represents the channel quantity of each texel in the second texture storage structure, and $\lfloor \ \rfloor$ represents a round-down operation symbol.

In some embodiments, after dimension reduction is performed on the weight data, regardless of whether the second texture storage structure is an RGB-channel 3D texture storage structure or an RGBA-channel 3D texture storage structure, the depth of the second texture storage structure may be determined in a manner similar to that described above of determining the depth of the first texture storage structure. In this process, the other channel quantity that is not merged into another parameter during dimension reduction on the weight data corresponds to the channel quantity of the input data.

For example, for a convolutional layer in a convolutional neural network, if the convolutional layer has a group quantity of 1, a data amount of weight data of the convolutional layer is input_channel*output_channel*kernel_w*kernel_h, input_channel being an input channel quantity of the convolutional layer, output_channel being an output channel quantity of the convolutional layer, kernel w being a pixel width of a convolution kernel, and kernel_h being a pixel height of the convolution kernel. The weight data of the convolutional layer is arranged in an RGBA-channel texture, and in texture storage structure parameters of the RGBA-channel texture, a width may be set to kernel w, a height may be set to kernel_h*output_channel (that is, weight data corresponding to an output channel is added to a pixel height direction to implement dimension reduction), and a depth may be set to be obtained by rounding down a value of (input_channel+3)/4.

In some embodiments, the second texture storage structure is a 3D texture storage structure, and the second texture storage structure parameters include a height, a width, and a depth of the texture storage structure; and
in a case that the parameter data related to the data amount of the weight data includes a pixel width and a pixel height of the weight data, and an input channel quantity or an output channel quantity of the data processing layer, the determining second texture storage structure parameters of the second texture storage structure based on the parameter data related to the data amount of the weight data and a data storage manner of the second texture storage structure includes:
using the pixel width of the weight data as the width of the second texture storage structure, using the pixel height of the weight data as the height of the second texture storage structure, and determining the depth of the second texture storage structure based on the input channel quantity or the output channel quantity of the data processing layer, and the channel quantity of each texel in the second texture storage structure.

In some embodiments, the determining the depth of the second texture storage structure based on the input channel quantity or the output channel quantity of the data processing layer, and the channel quantity of each texel in the second texture storage structure includes:
determining the depth of the second texture structure by using the following expression:

$$d_3 = \left\lfloor \frac{(c_3 + s_3 - 1)}{s_3} \right\rfloor$$

where $d_3$ represents the depth of the second texture storage structure, $c_3$ represents the input channel quantity or the output channel quantity, $s_3$ represents the channel quantity of each texel in the second texture storage structure, and $\lfloor \ \rfloor$ represents a round-down operation symbol.

In some embodiments, if the parameter data related to the data amount of the weight data includes the pixel width and the pixel height of the weight data, and the input channel quantity or the output channel quantity of the data processing layer, the weight data in this case may be analogized to picture data, and the second texture storage structure parameters in this case are determined in the manner of determining the first texture storage structure parameters. The channel quantity of the input data corresponds to the input channel quantity or the output channel quantity.

Figure 5:
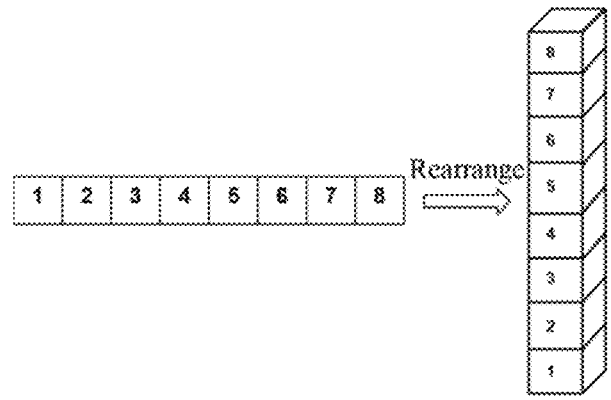
FIG. 5 is a schematic diagram of a process of storing weight data in an example according to an embodiment.

For example, for a scaling layer in a neutral network, because an input channel quantity input_channel and an output channel quantity output_channel of the scaling layer are equal, a data amount of weight data of the scaling layer is input_channel (or output_channel)*1*1. The weight data of the scaling layer is arranged in an RGBA-channel texture structure, and in texture storage structure parameters of the RGBA-channel texture structure, a width may be set to 1, a height may be set to 1, and a depth may be set to be obtained by rounding down a value of (input_channel+3)/4 or (output_channel+3)/4. As shown in FIG. 5, weight data (1, 2, 3, 4, 5, 6, 7, 8) of a scaling layer with an input channel quantity input_channel of 8 is stored in an RGBA-channel 3D texture storage structure with a height of 1, a width of 1, and a depth of 2.

In some embodiments, data processing of the data processing layer is performed by using at least one computation unit in the GPU; and the performing data processing of the data processing layer based on the first texture data and the second texture data, to obtain output data of the data processing layer includes:

reading, by using computation units, input data stored at a first texture location in the first texture data, and reading, by using the computation units, weight data that is in the second texture data and stored at a second texture location corresponding to the first texture location; and performing, by using the computation units, data processing on the input data and corresponding weight data that are read, to obtain the output data of the data processing layer.

In an actual application, the texture location may be determined by using texture coordinates.

Due to a correspondence between each piece of input data and corresponding weight data, when the input data and the weight data are stored, texture coordinates of the first texture data and texture coordinates of the second texture data may be associatively stored according to the correspondence between the input data and the weight data. It may be understood that, for ease of corresponding between the input data and the weight data, the texture storage structures corresponding to the first texture data and the second texture data may adopt the same data storage manner, for example, both adopt an RGBA-channel texture.

In some embodiments, each computation unit in the GPU reads all data in a texel in the texture storage structure every time. In this case, after a computation unit reads data in a texel in the first texture data, the computation unit reads corresponding weight data from the second texture data according to texture coordinates (that is, indexes) associatively stored, and performs computation to obtain corresponding output data. It may be understood that, each piece of input data is stored in a channel of a texel of the first texture data. In this case, the input data may be positioned by using texture coordinates of the texel in the first texture data and a channel location of the texel. Similarly, any weight data may be positioned in the second texture data according to texture coordinates and a channel location.

For example, both storage manners of first texture data and second texture data corresponding to a scaling layer are an RGBA-channel 3D texture, four pieces of input data corresponding to a texel with coordinates (0, 0, 0) in the first texture data and four pieces of weight data corresponding to a texel with coordinates (0, 0, 0) in the second texture data are associatively stored. In a forward computation process, a computation unit of the GPU reads a texel at a location (0, 0, 0) in the first texture data, the texel including four pieces of data in four channels (0, 0, 1), (0, 0, 2), (0, 0, 0), and (0, 0, 3), and the computation unit also reads four pieces of data in a texel at a location (0, 0, 0) in the second texture data, and performs forward computation according to a corresponding channel correspondence, that is, multiplies the input data by corresponding scaling weights and then adds corresponding bias weights, to obtain four output results. Further, the four output results may be further stored into an output RGBA-channel texture at a location (0, 0, 0).

Technical effects of this embodiment are mainly reflected in efficiency of forward computation of the neural network. A larger channel quantity of a used texture storage structure indicates higher computation efficiency. For the same neural network model, a time for forward computation in a solution using an RGBA-channel texture may be 30% to 50% less than that in a solution using an R-channel texture. Table 1 shows computation times on different graphics cards when a single-channel texture and an RGBA-channel texture are used as storage structures for running a portrait segmentation model. It may be learned that a time of the solution using the RGBA-channel texture is significantly shorter.

TABLE 1

| Graphics card type | Running time (ms) when the single-channel texture is used | Running time (ms) when the RGBA-channel texture is used | Performance improvement percentage (%) |
|---|---|---|---|
| Brand 1 | 52 ms | 33 ms | 36.5% |
| Brand 2 | 45 ms | 25 ms | 44.4% |
| Brand 3 | 22 ms | 10 ms | 54.5% |

Figure 6:
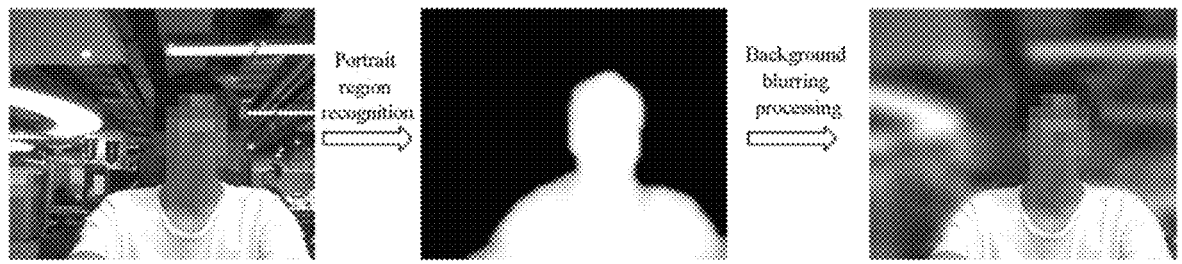
FIG. 6 is a schematic effect diagram of a background bluffing function in an example according to an embodiment.

This embodiment is mainly applied to a forward computation library of the neural network. Because the forward computation library of the neural network provides computation capabilities of all neural network algorithms, application scenarios of this embodiment are the same as application scenarios in which the forward computation library of the neural network is used. An application range may mainly include applications related to an AI algorithm, such as a portrait segmentation algorithm, gesture recognition, and image saliency recognition. Examples of the application scenarios are as follows:

(1) Background blurring: As shown in FIG. 6, to meet a need to eliminate background in a video call, a portrait region in each frame of image is recognized through forward computation of the neural network, and then a background region other than the portrait region is blurred, to eliminate background in a video. In this scenario, in a process of portrait region recognition through forward computation of the neural network, the method for forward computation according to this embodiment is used, that is, input data and weight data in the neural network are stored by using RGBA-channel texture storage structures (or RGB-channel texture storage structures), so that efficiency of a forward computation process is improved, and a background blurring speed is increased.

Figure 7:
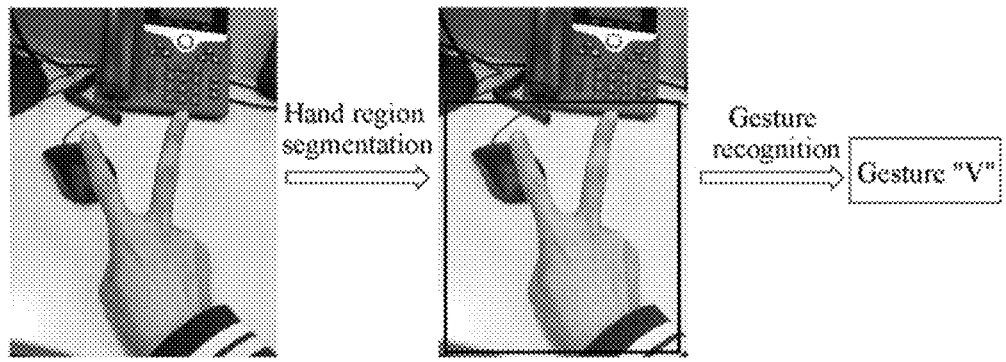
FIG. 7 is a schematic effect diagram of a gesture recognition function in an example according to an embodiment.

(2) Gesture recognition: As shown in FIG. 7, a region (a region in a rectangular box in the figure) including a hand in a picture is first obtained by segmentation through forward computation of the neural network, and then a gesture in the region obtained through segmentation is recognized. A process of recognizing a gesture "V" is shown in the figure. In this scenario, in a process of gesture recognition through forward computation of the neural network, the method for forward computation according to this embodiment is used, that is, input data and weight data in the neural network are stored by using RGBA-channel texture storage structures (or RGB-channel texture storage structures), so that efficiency of a forward computation process is improved, and a gesture recognition speed is increased.

Figure 8:
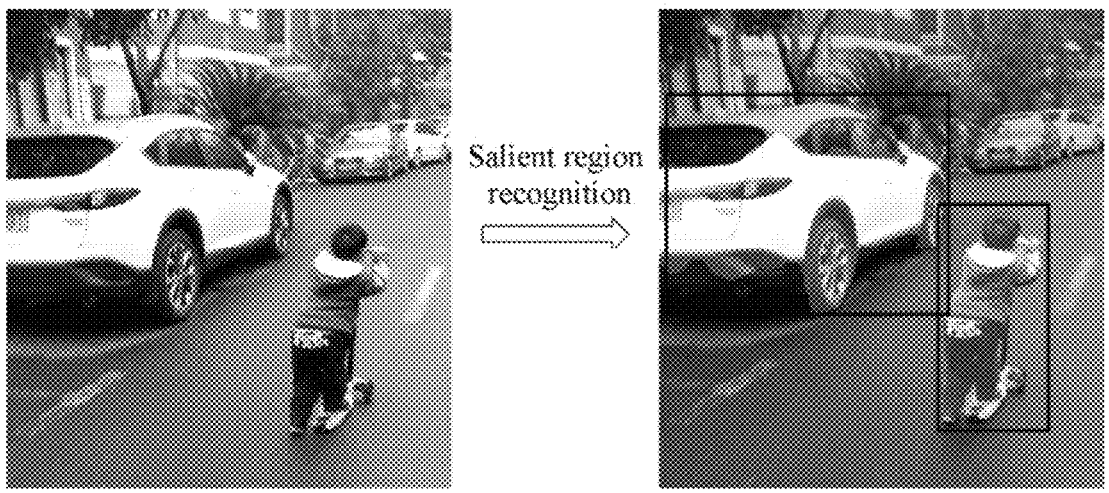
FIG. 8 is a schematic effect diagram of an image saliency recognition function in an example according to an embodiment.

(3) Image saliency recognition: As shown in FIG. 8, a car and a child are two objects in a picture that people pay attention to when looking at the picture. The salient content may be marked through forward computation of the neural network. As shown, two rectangular boxes are used to mark a car and a child. In this scenario, in a process of image saliency recognition through forward computation of the neural network, the method for forward computation according to this embodiment is used, that is, input data and weight data in the neural network are stored by using RGBA-channel texture storage structures (or RGB-channel texture storage structures), so that efficiency of a forward computation process is improved, and an image saliency recognition speed is increased.

The method for forward computation of a neural network according to this application may significantly improve efficiency in implementing functions in the three application scenarios.

Figure 9:
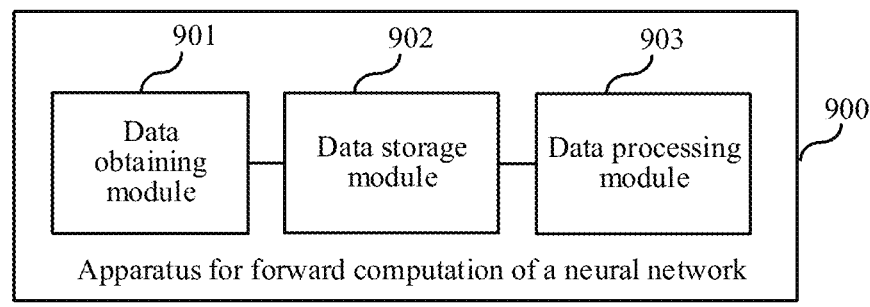
FIG. 9 is a structural block diagram of an apparatus for forward computation of a neural network according to an embodiment.

FIG. 9 is a structural block diagram of an apparatus for forward computation of a neural network according to an embodiment. The apparatus 900 is configured to perform data processing of at least one data processing layer in the neural network. As shown in FIG. 9, the apparatus 900 may include: a data obtaining module 901, a data storage module 902, and a data processing module 903.

The data obtaining module 901 is configured to obtain input data and weight data of the data processing layer.

The data storage module 902 is configured to store the input data by using a first texture storage structure to obtain first texture data, and store the weight data by using a second texture storage structure to obtain second texture data.

The data processing module 903 is configured to perform data processing of the data processing layer based on the first texture data and the second texture data, to obtain output data of the data processing layer.

For the at least one data processing layer in the neural network, the input data and the weight data are respectively stored in corresponding texture storage structures, so that a time consumed by the data processing layer to read and store data in a data processing process is reduced, and efficiency of forward computation of the neural network is improved greatly, because the texture storage structures have simple and convenient indexes and store a large data amount.

In some embodiments, the first texture storage structure or the second texture storage structure is any one of the following:

an RGBA-channel 3D texture storage structure;
an RGB-channel 3D texture storage structure;
an RGBA-channel 2D texture storage structure; and
an RGB-channel 2D texture storage structure.

In some embodiments, the first texture data and the second texture data each include at least one texel, each texel has a channel quantity of 3 or 4, and at least one texel is formed by corresponding input data or weight data sequentially according to the channel quantity.

In some embodiments, the data storage module may be configured to:

obtain a pixel width, a pixel height, and a channel quantity of the input data;
determine first texture storage structure parameters of the first texture storage structure based on the pixel width, the pixel height, and the channel quantity of the input data and a data storage manner of the first texture storage structure; and
store the input data according to the first texture storage structure parameters, to obtain the first texture data.

In some embodiments, the first texture storage structure is a 3D texture storage structure, and the first texture storage structure parameters include a height, a width, and a depth of the texture storage structure; and the data storage module may be configured to:

use the pixel width of the input data as the width of the first texture storage structure, use the pixel height of the input data as the height of the first texture storage structure, and determine the depth of the first texture storage structure based on the channel quantity of the input data and a channel quantity of each texel in the first texture storage structure.

In some embodiments, the data storage module may be configured to:

determine the depth of the first texture storage structure by using the following expression:

$$d_1 = \left\lfloor \frac{(c_1 + s_1 - 1)}{s_1} \right\rfloor$$

where $d_1$ represents the depth of the first texture storage structure, $c_1$ represents the channel quantity of the input data, $s_1$ represents the channel quantity of each texel in the first texture storage structure, and $\lfloor \ \rfloor$ represents a round-down operation symbol.

In some embodiments, the data storage module may be configured to:

obtain parameter data related to a data amount of the weight data;
determine second texture storage structure parameters of the second texture storage structure based on the parameter data related to the data amount of the weight data and a data storage manner of the second texture storage structure; and
store the weight data according to the second texture storage structure parameters, to obtain the second texture data.

In some embodiments, the second texture storage structure is a 3D texture storage structure, and the second texture storage structure parameters include a height, a width, and a depth of the texture storage structure; and in a case that the parameter data related to the data amount of the weight data includes a pixel width and a pixel height of the weight data, and an input channel quantity and an output channel quantity of the data processing layer, the data storage module may be configured to:
- determine the height and the width of the second texture storage structure based on one of the input channel quantity and the output channel quantity of the data processing layer, and the pixel width and the pixel height of the weight data; and
- determine the depth of the second texture storage structure based on the other of the input channel quantity and the output channel quantity of the data processing layer, and a channel quantity of each texel in the second texture storage structure.

In some embodiments, the data storage module may be configured to:
- use the pixel width of the weight data as the width of the second texture storage structure; and
- use a product of the pixel height of the weight data and the channel quantity as the height of the first texture storage structure; and
- the determining the depth of the second texture storage structure based on the other of the input channel quantity and the output channel quantity of the data processing layer, and a channel quantity of each texel in the second texture storage structure includes:
- determining the depth of the second texture storage structure by using the following expression:

$$d_2 = \left\lfloor \frac{(c_2 + s_2 - 1)}{s_2} \right\rfloor$$

where $d_2$ represents the depth of the second texture storage structure, $c_2$ represents the other channel quantity, $s_2$ represents the channel quantity of each texel in the second texture storage structure, and $\lfloor \ \rfloor$ represents a round-down operation symbol.

In some embodiments, the second texture storage structure is a 3D texture storage structure, and the second texture storage structure parameters include a height, a width, and a depth of the texture storage structure; and
- in a case that the parameter data related to the data amount of the weight data includes a pixel width and a pixel height of the weight data, and an input channel quantity or an output channel quantity of the data processing layer, the data storage module may be configured to:
- use the pixel width of the weight data as the width of the second texture storage structure, use the pixel height of the weight data as the height of the second texture storage structure, and determine the depth of the second texture storage structure based on the input channel quantity or the output channel quantity of the data processing layer, and a channel quantity of each texel in the second texture storage structure.

In some embodiments, the data storage module may be configured to:
- determine the depth of the second texture storage structure by using the following expression:

$$d_3 = \left\lfloor \frac{(c_3 + s_3 - 1)}{s_3} \right\rfloor$$

where $d_3$ represents the depth of the second texture storage structure, $c_3$ represents the input channel quantity or the output channel quantity, $s_3$ represents the channel quantity of each texel in the second texture storage structure, and $\lfloor \ \rfloor$ represents a round-down operation symbol.

In some embodiments, data processing of the data processing layer is performed by using at least one computation unit in a GPU; and the data processing module may be configured to:
- read, by using computation units, input data stored at a first texture location in the first texture data, and read, by using the computation units, weight data that is in the second texture data and stored at a second texture location corresponding to the first texture location; and
- perform, by using the computation units, data processing on the input data and corresponding weight data that are read, to obtain the output data of the data processing layer.

Based on the same principle, an electronic device according to embodiments is provided. The electronic device includes a memory, a processor, and a computer program that is stored in the memory and capable of being executed by the processor. When the processor executes the computer program, the method provided in any embodiment is implemented. Specifically, the following case may be implemented:

A method for data processing of at least one data processing layer in a neural network includes: obtaining input data and weight data of the data processing layer; storing the input data by using a first texture storage structure to obtain first texture data, and storing the weight data by using a second texture storage structure to obtain second texture data; and performing data processing of the data processing layer based on the first texture data and the second texture data, to obtain output data of the data processing layer.

The embodiments provide a computer-readable storage medium, storing a computer program, the program, when being executed by a processor, implementing the method shown in any embodiment.

It may be understood that, the medium may store a computer program corresponding to the method for forward computation of a neural network.

Figure 10:
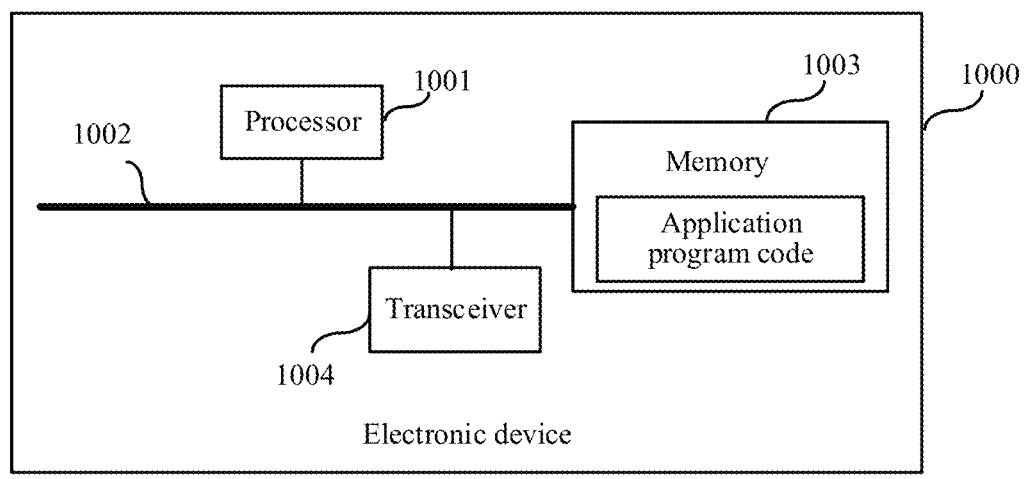
FIG. 10 is a schematic structural diagram of an electronic device according to an embodiment.

FIG. 10 is a schematic structural diagram of an electronic device according to an embodiment. As shown in FIG. 10, the electronic device 1000 shown in FIG. 10 includes a processor 1001 (e.g., a hardware processor) and a memory 1003. The processor 1001 and the memory 1003 are connected, for example, are connected by using a bus 1002. Further, the electronic device 1000 may further include a transceiver 1004, and the electronic device 1000 may exchange data with another electronic device by using the transceiver 1004. According to various embodiments, there may be one or more transceivers 1004. The structure of the electronic device 1000 may vary and is not limited to the specifically disclosed components.

The processor 1001 is applied to the embodiments, and may be configured to implement functions of the data obtaining module, the data storage module, and the data processing module shown in FIG. 9.

The processor 1001 may be a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processor 901 may implement or perform various examples of logic blocks, modules, and circuits described with reference to content disclosed herein. The processor 1001 may alternatively be a combination to implement a computing function, for example, may be a combination of one or more microprocessors, or a combination of a DSP and a microprocessor.

The bus 1002 may include a channel, to transmit information between the foregoing components. The bus 1002 may be a PCI bus, an EISA bus, or the like. The bus 1002 may be classified into an address bus, a data bus, a control bus, and the like. For ease of description, the bus in FIG. 10 is represented by using only one bold line, but which does not indicate that there is only one bus or one type of bus.

The memory 1003 may be a read-only memory (ROM) or another type of static storage device that may store static information and static instructions; or a random access memory (RAM) or another type of dynamic storage device that may store information and instructions; or may be an electrically erasable programmable read-only memory (EEPROM), a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that may be configured to carry or store expected program code in a form of instructions or a data structure and that is accessible by a computer, but is not limited thereto.

The memory 1003 is configured to store application program codes for performing the operations described herein, and is controlled and executed by the processor 1001. The processor 1001 is configured to execute the application program code stored in the memory 1003, to implement actions of the apparatus for forward computation of a neural network according to the embodiment shown in FIG. 9.

Although the operations in the flowchart in the accompanying drawings are sequentially shown according to indication of an arrow, the operations are not necessarily sequentially performed according to a sequence indicated by the arrow. Unless explicitly specified in this specification, execution of the operations are not strictly limited in the sequence, and the operations may be performed in other sequences. In addition, at least some operations in the flowcharts in the accompanying drawings may include a plurality of sub-operations or a plurality of stages. The sub-operations or the stages are not necessarily performed at the same moment, but may be performed at different moments. The sub-operations or the stages are not necessarily performed in sequence, but may be performed in turn or alternately with another operation or at least some of sub-operations or stages of the another operation.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While embodiments have been particularly shown and described, it will be understood that various changes in form and detail may be made therein without departing from the spirit and scope of the following claims.

What is claimed is:

1. A method for forward computation of a neural network, performed by a computer device, for data processing at least one data processing layer in the neural network, the method comprising:

obtaining input data and weight data of the at least one data processing layer;

storing the input data by using a first texture storage structure to obtain first texture data, a plurality of data elements in the input data corresponding to a first index of the first texture data, and the computer device accessing data in the first texture data by using the first index as a unit;

determining a channel quantity of a second texture storage structure based on parameter data related to a data amount of the weight data and a dimension quantity of a second index of the second texture storage structure;

storing the weight data by using the second texture storage structure to obtain second texture data, a plurality of data elements in the weight data corresponding to the second index of the second texture data, and the computer device accessing data in the second texture data by using the second index as a unit; and performing data processing of the at least one data processing layer based on the first texture data and the second texture data, to obtain output data of the at least one data processing layer.

2. The method according to claim 1, wherein the first texture data comprises at least one texel indexed in at least two dimensions, each of the at least one texel has a plurality of channels, and each of the plurality of channels is used for storing a data element in the input data, and the storing the input data by using the first texture storage structure to obtain the first texture data comprises sequentially storing data elements in the input data into the plurality of channels of the at least one texel.

3. The method according to claim 2, further comprising:

obtaining a pixel width, a pixel height, and a channel quantity of the input data; and determining magnitudes in the at least two dimensions and a channel quantity of the first texture storage structure based on the pixel width, the pixel height, and the channel quantity of the input data and a dimension quantity of the first index of the first texture storage structure, a product of the determined magnitudes in the at least two dimensions and the determined channel quantity being not less than a product of the pixel width, the pixel height, and the channel quantity of the input data.

4. The method according to claim 3, wherein the first texture storage structure is a 3D texture storage structure, and the at least two dimensions comprise a height, a width, and a depth, and the determining the magnitudes in the at least two dimensions and the channel quantity of the first texture storage structure comprises:

using the pixel width of the input data as the width of the first texture storage structure, and using the pixel height of the input data as the height of the first texture storage structure; and determining the depth of the first texture storage structure based on the channel quantity of the input data and the channel quantity of each texel in the first texture storage structure.

5. The method according to claim 4, wherein the determining the depth of the first texture storage structure based on the channel quantity of the input data and the channel quantity of is based on the following expression:

$$d_1 = \left\lfloor \frac{(c_1 + s_1 - 1)}{s_1} \right\rfloor$$

wherein $d_1$ represents the depth of the first texture storage structure, $c_1$ represents the channel quantity of the input data, $s_1$ represents the channel quantity of each texel in the first texture storage structure, $\lfloor \ \rfloor$ and represents a round-down operation symbol.

6. The method according to claim 1, wherein the storing the weight data by using the second texture storage structure to obtain the second texture data comprises:

obtaining the parameter data related to the data amount of the weight data;

determining, based on the parameter data related to the data amount of the weight data and the dimension quantity of the second index of the second texture storage structure, magnitudes in at least two dimensions and the channel quantity of the second texture storage structure that enable the second texture storage structure to store a data amount not less than the data amount of the weight data; and sequentially storing data elements in the weight data into channels of texels in the second texture storage structure, to obtain the second texture data.

7. The method according to claim 6, wherein the second texture storage structure is a 3D texture storage structure, and the at least two dimensions of the second texture storage structure comprise a height, a width, and a depth of the second texture storage structure, and based on the parameter data related to the data amount of the weight data comprising a pixel width and a pixel height of the weight data, and an input channel quantity and an output channel quantity of the at least one data processing layer, the determining the magnitudes in the at least two dimensions and the channel quantity of the second texture storage structure comprises:

determining the height and the width of the second texture storage structure based on one a first one of the input channel quantity and the output channel quantity of the at least one data processing layer, and the pixel width and the pixel height of the weight data; and determining the depth of the second texture storage structure based on a second one of the input channel quantity and the output channel quantity of the at least one data processing layer, and the channel quantity of each texel in the second texture storage structure.

8. The method according to claim 7, wherein the determining the height and the width of the second texture storage structure comprises:

using the pixel width of the weight data as the width of the second texture storage structure; and using a product of the pixel height of the weight data and the channel quantity as the height of the first texture storage structure, and the determining the depth of the second texture storage structure comprises:

determining the depth of the second texture storage structure based on the following expression:

$$d_2 = \left\lfloor \frac{(c_2 + s_2 - 1)}{s_2} \right\rfloor$$

wherein $d_2$ represents the depth of the second texture storage structure, $c_2$ represents the other channel quantity, $s_2$ represents the channel quantity of each texel in the second texture storage structure, and $\lfloor \ \rfloor$ represents a round-down operation symbol.

9. The method according to claim 6, wherein the second texture storage structure is a 3D texture storage structure, and the at least two dimensions of the second texture storage structure comprise a height, a width, and a depth of the second texture storage structure; and based on the parameter data related to the data amount of the weight data comprising a pixel width and a pixel height of the weight data, and an input channel quantity or an output channel quantity of the at least one data processing layer, the determining the magnitudes in the at least two dimensions and the channel quantity of the second texture storage structure comprises:

using the pixel width of the weight data as the width of the second texture storage structure, using the pixel height of the weight data as the height of the second texture storage structure, and determining the depth of the second texture storage structure based on the input channel quantity or the output channel quantity of the at least one data processing layer, and the channel quantity of each texel in the second texture storage structure.

10. The method according to claim 9, wherein the determining the depth of the second texture storage structure based on the input channel quantity or the output channel quantity of the at least one data processing layer, and the channel quantity of each texel in the second texture storage structure comprises:

determining the depth of the second texture storage structure based on the following expression:

$$d_3 = \left\lfloor \frac{(c_3 + s_3 - 1)}{s_3} \right\rfloor$$

wherein $d_3$ represents the depth of the second texture storage structure, $c_3$ represents the input channel quantity or the output channel quantity, $s_3$ represents the channel quantity of each texel in the second texture storage structure, and ⌊ ⌋ represents a round-down operation symbol.

11. The method according to claim 1, wherein the performing data processing of the at least one data processing layer is performed by using at least one computation unit in a graphics processing unit (GPU), and the performing data processing of the at least one data processing layer based on the first texture data and the second texture data, to obtain output data of the at least one data processing layer comprises:

reading, by using computation units, input data stored at a first index location in the first texture data, and reading, by using the computation units, weight data that is in the second texture data and stored at a second index location corresponding to the first index location; and performing, by using the computation units, data processing on the input data and corresponding weight data that are read, to obtain the output data of the at least one data processing layer.

12. The method according to claim 1, wherein the first texture storage structure or the second texture storage structure is any one of the following:

a red, green, blue, alpha (RGBA)-channel 3D texture storage structure;
an RGB-channel 3D texture storage structure;
an RGBA-channel 2D texture storage structure; and
an RGB-channel 2D texture storage structure.

13. An apparatus configured to perform data processing of at least one data processing layer in a neural network, the apparatus comprising:

at least one memory configured to store program code; and at least one processor configured to read the program code and operate as instructed by the program code, the program code comprising:

data obtaining code configured to cause at least one of the at least one processor to obtain input data and weight data of the at least one data processing layer;

data storage code configured to cause at least one of the at least one processor to store the input data by using a first texture storage structure to obtain first texture data, determine a channel quantity of a second texture storage structure based on parameter data related to a data amount of the weight data and a dimension quantity of a second index of the second texture storage structure, and store the weight data by using the second texture storage structure to obtain second texture data, a plurality of data elements in the input data corresponding to a first index of the first texture data, a plurality of data elements in the weight data corresponding to the second index of the second texture data, the apparatus accessing data in the first texture data by using the first index as a unit and the second texture data by using the second index as a unit; and data processing code configured to cause at least one of the at least one processor perform data processing of the at least one data processing layer based on the first texture data and the second texture data, to obtain output data of the at least one data processing layer.

14. The apparatus according to claim 13, wherein the first texture data comprises at least one texel indexed in at least two dimensions, each of the at least one texel has a plurality of channels, and each of the plurality of channels is configured to store a data element in the input data, and the data storage code is further configured to cause at least one of the at least one processor to sequentially store data elements in the input data into the plurality of channels of the at least one texel.

15. The apparatus according to claim 13, wherein the data storage code is further configured to cause at least one of the at least one processor to:

obtain a pixel width, a pixel height, and a channel quantity of the input data; and determine magnitudes in at least two dimensions and a channel quantity of the first texture storage structure based on the pixel width, the pixel height, and the channel quantity of the input data and a dimension quantity of the first index of the first texture storage structure, a product of the determined magnitudes in the at least two dimensions and the determined channel quantity being not less than a product of the pixel width, the pixel height, and the channel quantity of the input data.

16. The apparatus according to claim 13, wherein the data storage code is further configured to cause at least one of the at least one processor to:

obtain the parameter data related to the data amount of the weight data;

determine, based on the parameter data related to the data amount of the weight data and the dimension quantity of the second index of the second texture storage structure, magnitudes in at least two dimensions and the channel quantity of the second texture storage structure that enable the second texture storage structure to store a data amount not less than the data amount of the weight data; and sequentially store data elements in the weight data into channels of texels in the second texture storage structure, to obtain the second texture data.

17. The apparatus according to claim 16, wherein the second texture storage structure is a 3D texture storage structure, and the at least two dimensions of the second texture storage structure comprise a height, a width, and a depth of the second texture storage structure, and the data storage code is further configured to cause at least one of the at least one processor to determine the magnitudes in the at least two dimensions and the channel quantity of the second texture storage structure, based on the parameter data related to the data amount of the weight data comprising a pixel width and a pixel height of the weight data, and an input channel quantity and an output channel quantity of the at least one data processing layer, by:

determining the height and the width of the second texture storage structure based on one a first one of the input channel quantity and the output channel quantity of the at least one data processing layer, and the pixel width and the pixel height of the weight data; and determining the depth of the second texture storage structure based on a second one of the input channel quantity and the output channel quantity of the at least one data processing layer, and the channel quantity of each texel in the second texture storage structure.

18. The apparatus according to claim 17, wherein
the data storage code is further configured to cause at least one of the at least one processor to determine the height and the width of the second texture storage structure by:
using the pixel width of the weight data as the width of the second texture storage structure; and
using a product of the pixel height of the weight data and the channel quantity as the height of the first texture storage structure, and
the determining the depth of the second texture storage structure comprises:
determining the depth of the second texture storage structure based on the following expression:

$$d_2 = \left\lfloor \frac{(c_2 + s_2 - 1)}{s_2} \right\rfloor$$

wherein $d_2$ represents the depth of the second texture storage structure, $c_2$ represents the other channel quantity, $s_2$ represents the channel quantity of each texel in the second texture storage structure, and $\lfloor \ \rfloor$ represents a round-down operation symbol.

19. The apparatus for forward computation according to claim 13, wherein the data processing code is further configured to cause at least one of the at least one processor to:
read, by using at least one computation unit in a graphics processing unit (GPU), input data stored at a first index location in the first texture data, and read, by using the computation units, weight data that is in the second texture data and stored at a second index location corresponding to the first index location; and
perform, by using the computation units, data processing on the input data and corresponding weight data that are read, to obtain the output data of the at least one data processing layer.

20. A non-transitory computer-readable storage medium, storing a computer program, the computer program being executable by at least one processor to cause the at least one processor to perform a method for forward computation of a neural network for data processing at least one data processing layer in the neural network, the method comprising:
obtaining input data and weight data of the at least one data processing layer;
storing the input data by using a first texture storage structure to obtain first texture data, a plurality of data elements in the input data corresponding to a first index of the first texture data, and the computer device accessing data in the first texture data by using the first index as a unit;
determining a channel quantity of a second texture storage structure based on parameter data related to a data amount of the weight data and a dimension quantity of a second index of the second texture storage structure;
storing the weight data by using the second texture storage structure to obtain second texture data, a plurality of data elements in the weight data corresponding to the second index of the second texture data, and the computer device accessing data in the second texture data by using the second index as a unit; and
performing data processing of the at least one data processing layer based on the first texture data and the second texture data, to obtain output data of the at least one data processing layer.

\* \* \* \* \*